(12) United States Patent
Schwarzer et al.

(10) Patent No.: US 10,910,685 B2
(45) Date of Patent: Feb. 2, 2021

(54) VEHICLE HAVING A HIGH-VOLTAGE BATTERY

(71) Applicant: Bayerische Motoren Werke Aktiengesellschaft, Munich (DE)

(72) Inventors: Michael Schwarzer, Munich (DE); Semi Ben Salah, Finsing (DE); Nicolas Flahaut, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 234 days.

(21) Appl. No.: 16/183,974

(22) Filed: Nov. 8, 2018

(65) Prior Publication Data

US 2019/0074561 A1  Mar. 7, 2019

Related U.S. Application Data

(63) Continuation of application No. PCT/EP2017/059884, filed on Apr. 26, 2017.

(30) Foreign Application Priority Data

May 10, 2016 (DE) .......................... 10 2016 208 053

(51) Int. Cl.
  *H01M 10/6553* (2014.01)
  *H01M 2/10* (2006.01)
  (Continued)

(52) U.S. Cl.
  CPC ........... *H01M 10/6553* (2015.04); *B60K 1/04* (2013.01); *B60L 3/0007* (2013.01); *B60L 58/26* (2019.02);
  (Continued)

(58) Field of Classification Search
  None
  See application file for complete search history.

(56) References Cited

U.S. PATENT DOCUMENTS

2002/0012833 A1*  1/2002  Gow ................... H01M 2/1264
                                                        429/120
2007/0031728 A1*  2/2007  Lee ..................... H01M 10/651
                                                        429/120
(Continued)

FOREIGN PATENT DOCUMENTS

CN         1905268 A    1/2007
CN       102347509 A    2/2012
(Continued)

OTHER PUBLICATIONS

International Search Report (PCT/ISA/210) issued in PCT Application No. PCT/EP2017/059884 dated Jun. 16, 2017 with English translation (six (6) pages).

(Continued)

*Primary Examiner* — Rena Dye Cronin
(74) *Attorney, Agent, or Firm* — Crowell & Moring LLP

(57) ABSTRACT

Vehicle having a high-voltage battery which has a housing, wherein the housing has a housing floor which is essentially parallel to an underlying surface on which the vehicle is standing or travelling, a housing cover which is arranged spaced apart from the housing floor, housing walls via which the housing floor is connected to the housing cover. The housing has at least one housing structure plate which has a plane of maximum size which is perpendicular with respect to the housing floor and with respect to the housing cover, and an underside which faces the housing floor or is connected thereto, and an upper side which faces the housing cover or is connected thereto. In an interior space of the housing structure plate at least two parallel cooling ducts are provided, through which coolant or a cooling agent flows, and on a first side and a second side, lying opposite the first side, of the housing structure plate at least one electrical storage cell is respectively arranged, in particular a multiplicity of electrical storage cells are respectively arranged, (Continued)

wherein the storage cells each have a positive and a negative connecting pole. At least one connecting pole or both connecting poles of the storage cells is/are connected to the first and/or second side of the housing structure plate in a thermally conductive and electrically insulated fashion.

28 Claims, 2 Drawing Sheets

(51) Int. Cl.

| | | |
|---|---|---|
| H01M 10/625 | (2014.01) | |
| H01M 10/653 | (2014.01) | |
| H01M 10/663 | (2014.01) | |
| H01M 10/6557 | (2014.01) | |
| H01M 10/6555 | (2014.01) | |
| H01M 10/613 | (2014.01) | |
| H01M 10/6567 | (2014.01) | |
| H01M 10/04 | (2006.01) | |
| B60K 1/04 | (2019.01) | |
| H01M 10/6561 | (2014.01) | |
| B60L 3/00 | (2019.01) | |
| B60L 58/26 | (2019.01) | |
| H01M 10/6568 | (2014.01) | |
| H01M 2/02 | (2006.01) | |
| B60K 1/00 | (2006.01) | |
| B60K 11/02 | (2006.01) | |

(52) U.S. Cl.
CPC ....... *H01M 2/0285* (2013.01); *H01M 2/1077* (2013.01); *H01M 2/1083* (2013.01); *H01M 10/0413* (2013.01); *H01M 10/613* (2015.04); *H01M 10/625* (2015.04); *H01M 10/653* (2015.04); *H01M 10/6555* (2015.04); *H01M 10/6557* (2015.04); *H01M 10/6561* (2015.04); *H01M 10/6567* (2015.04); *H01M 10/6568* (2015.04); *H01M 10/663* (2015.04); *B60K 11/02* (2013.01); *B60K 2001/005* (2013.01); *B60K 2001/0438* (2013.01); *H01M 10/0468* (2013.01); *H01M 10/0472* (2013.01); *H01M 2220/20* (2013.01); *Y02T 10/70* (2013.01)

(56) References Cited

U.S. PATENT DOCUMENTS

| | | |
|---|---|---|
| 2012/0028099 A1 | 2/2012 | Aoki |
| 2013/0059180 A1 | 3/2013 | Yang et al. |
| 2013/0084478 A1 | 4/2013 | Watanabe et al. |
| 2015/0180097 A1 | 6/2015 | Lustig et al. |
| 2015/0207115 A1 | 7/2015 | Wondraczek |
| 2016/0013526 A1 | 1/2016 | Uchiyama et al. |
| 2018/0154754 A1* | 6/2018 | Rowley ............... H01M 10/613 |
| 2018/0241106 A1* | 8/2018 | Yamamoto ........ H01M 10/6566 |

FOREIGN PATENT DOCUMENTS

| | | |
|---|---|---|
| CN | 102969544 A | 3/2013 |
| CN | 103035860 A | 4/2013 |
| CN | 103456907 A | 12/2013 |
| CN | 104241729 A | 12/2014 |
| CN | 104584263 A | 4/2015 |
| DE | 10 2009 019 010 A1 | 10/2010 |
| DE | 20 2012 006 447 U1 | 9/2012 |
| DE | 10 2011 086 130 A1 | 5/2013 |
| DE | 10 2012 103 129 A1 | 10/2013 |
| DE | 10 2012 215 848 A1 | 6/2014 |
| DE | 10 2013 225 605 A1 | 6/2015 |
| DE | 10 2014 200 877 A1 | 7/2015 |
| DE | 10 2015 111 194 A1 | 1/2016 |
| DE | 10 2015 008 985 A1 | 2/2016 |
| DE | 10 2014 217 931 A1 | 3/2016 |
| EP | 2 413 421 A1 | 2/2012 |
| JP | 2008-62875 A | 3/2008 |
| WO | WO 2015/159064 A1 | 10/2015 |

OTHER PUBLICATIONS

German-language Written Opinion (PCT/ISA/237) issued in PCT Application No. PCT/EP2017/059884 dated Jun. 16, 2017 (nine (9) pages).

German-language Office Action issued in counterpart German Application No. 10 2016 208 053.9 dated Mar. 7, 2017 with partial English translation (nine (9) pages).

Chinese-language Office Action issued in Chinese Application No. 201780011136.4 dated Sep. 3, 2020 with English translation (17 pages).

\* cited by examiner

VEHICLE HAVING A HIGH-VOLTAGE BATTERY

CROSS REFERENCE TO RELATED APPLICATIONS

This application is a continuation of PCT International Application No. PCT/EP2017/059884, filed Apr. 26, 2017, which claims priority under 35 U.S.C. § 119 from German Patent Application No. 10 2016 208 053.9, filed May 10, 2016, the entire disclosures of which are herein expressly incorporated by reference.

BACKGROUND AND SUMMARY OF THE INVENTION

The present invention relates to a vehicle having a high voltage battery which has a housing. The housing has a housing bottom which is substantially parallel to a roadway on which the vehicle is standing or driving, a housing cover which is arranged spaced apart from the housing bottom, and housing walls, via which the housing bottom is connected to the housing cover.

A vehicle of this type having a high voltage battery is known from DE 10 2012 215 848 A1.

High voltage batteries of vehicles are frequently cooled by way of refrigerant or coolant. A refrigerant is understood to mean substances which are used in refrigeration or air conditioning system circuits. Coolants are substances which are not evaporated, but rather circulate in the liquid state and dissipate heat from the high voltage battery. Here, what are known as "multi-port tubes" are frequently used, which are flat, relatively fragile aluminum tube constructions through which refrigerant or coolant flows.

It is an object of the invention to provide a vehicle with a high voltage battery which has a compact construction and further advantageous properties which go beyond this.

This and other objects are achieved by a vehicle having a high voltage battery which has a housing. The housing has a housing bottom which is substantially parallel to a roadway, on which the vehicle is standing or driving, a housing cover which is arranged spaced apart from the housing bottom, and housing walls, via which the housing bottom is connected to the housing cover. The housing has at least one housing structure plate which has a greatest flat plane which is perpendicular with respect to the housing bottom and with respect to the housing cover, and an underside which faces the housing bottom or is connected to it, and an upper side which faces the housing cover or is connected to it. At least one cooling duct or at least two parallel cooling ducts are provided in an interior of the housing structure plate, which cooling duct or ducts is/are flowed through by a refrigerant or a coolant. In each case at least one electric battery cell, in particular in each case a multiplicity of electric battery cells is/are arranged on a first side and a second side of the housing structure plate, which second side lies opposite the first side. The battery cells in each case have a positive and a negative connector pole. At least one connector pole or the two connector poles of the battery cells are connected in a thermally conducting and electrically insulated manner to the first and/or the second side of the housing structure plate.

A starting point of the invention is therefore a vehicle having a high voltage battery which has a housing. The housing of the high voltage battery has a housing bottom which is parallel or substantially parallel to a roadway, on which the vehicle is moving, and a housing cover which is arranged spaced apart from the housing bottom. The housing bottom is connected to the housing cover via housing walls.

At least one element which is called a "housing structure plate" in the following text and combines the function of a force-absorbing structural component and the function of a cooler within itself is arranged in the interior of the housing of the high voltage battery. The housing structure plate has a greatest flat plane which is perpendicular with respect to the housing bottom and perpendicular with respect to the housing cover. Furthermore, the housing structure plate has an underside which faces the housing bottom or is connected to the housing bottom, and an upper side which faces the housing cover or is connected to the housing cover.

At least one cooling duct is provided in the interior of the housing structure plate. As an alternative to this, two or more than two cooling ducts which are, for example, in parallel can also be provided in the interior of the housing structure plate, which cooling ducts are flowed through by a refrigerant or by a coolant in one and the same direction or in directions which are opposed to one another. As has already been described above, a refrigerant is understood to mean a substance which flows through a refrigeration or air conditioning system circuit and in the process is evaporated completely or at least partially. A coolant is a cooling substance which is liquid in the entire cooling circuit.

In each case at least one electric battery cell is arranged on sides of the housing structure plate which face away from one another, that is to say on a first side and on a second side of the housing structure plate, which second side faces away from the first side. A multiplicity of electric battery cells are preferably arranged in each case on the first side and the second side of the housing structure plate, which second side faces away from the first side. The electric battery cells in each case have a positive and a negative connector pole (connector terminal). Here, individual battery cells can be connected in series or in parallel. At least one connector pole or the two connector poles of individual battery cells or of all the battery cells are connected in a thermally conducting and electrically insulated manner to the first or the second side of the housing structure plate.

Here, during the operation of the high voltage battery, heat which is produced in the battery cells is dissipated via connector poles of the battery cells to the housing structure plate which is flowed through by refrigerant or coolant, and is transported away out of the housing of the high voltage battery via the refrigerant or coolant and is output to a heat sink (for example, the surroundings), to a vehicle component to be heated, or to the passenger compartment.

In accordance with one development of the invention, the housing structure plate extends between two housing walls which lie opposite one another, for example between a front wall (as viewed in a longitudinal direction of the vehicle) and a rear wall of the housing of the high voltage battery. The housing structure plate therefore preferably extends parallel to a longitudinal direction of the vehicle, which affords the advantage that, in the case of a longitudinal crash of the vehicle, the housing structure plate opposes a deformation of the housing of the high voltage battery.

In principle, however, the housing structure plate might also be arranged transversely with respect to a longitudinal direction of the vehicle. In this case, the housing structure plate would oppose a deformation of the housing of the high voltage battery in the case of a lateral crash of the vehicle.

In accordance with one development of the invention, a plurality of cooling ducts which act as "inflow ducts" and a plurality of cooling ducts which are parallel to the former and act as "return ducts" are provided in the interior of the housing structure plate, which return ducts are flowed through by refrigerant or coolant in an opposite direction to the inflow ducts. In each case at least one deflecting line section can be provided in end regions of the housing structure plate, via which deflecting line section an end of an inflow duct is flow-connected to a duct start of a return duct, or vice versa. A deflecting line section of this type can be formed, for example, by way of a separate component which is inserted between an end side of the housing structure plate and a housing wall. As an alternative to this, it can be provided that an end side of the housing structure plate reaches directly as far as a housing wall and is connected to the latter, and the at least one deflecting section is formed by way of a line section which is integrated into the housing wall and via which refrigerant or coolant flows from the end of an inflow duct to a duct start of a return duct, or vice versa.

As has already been mentioned above, a multiplicity of battery cells can be arranged on the first side and the second side of the housing structure plate, which second side faces away from the first side. It can be provided, in particular, that in each case at least one battery cell stack which is formed by way of a plurality of battery cells which are connected electrically to one another is arranged on the first side and the second side of the housing structure plate. Furthermore, it can be provided that in each case a plurality of battery cell stacks of this type are arranged on the first side and the second side of the housing structure plate. The individual battery cells of a battery cell stack can be connected electrically to one another in series, for example.

It is provided in accordance with one development of the invention that in each case a plurality of battery cell stacks are arranged behind one another in the longitudinal direction of the housing structure plate on the first side and the second side of the housing structure plate.

Furthermore, it can be provided that at least two housing structure plates which are arranged parallel to one another are provided in the housing of the high voltage battery, which housing structure plates in each case have a first and a second side, along which in each case a plurality of battery cell stacks are arranged.

In accordance with one development of the invention, the battery cells in each case have an upper side and an underside which form the largest sides of the battery cell and which are arranged substantially parallel to the housing bottom and to the housing cover.

As has already been mentioned above, each battery cell is connected in each case via at least one of its connector poles in a thermally conducting and electrically insulated manner to the housing structure plate. It can be provided here that the connector pole or poles of the battery cells is/are connected to the housing structure plate via a thermally conducting and electrically insulating adhesive layer.

As has already been mentioned above, the housing structure plate can be provided to absorb forces in the case of a crash and to oppose a deformation of the housing of the high voltage battery in the longitudinal direction of the housing structure plate. Furthermore, the housing structure plate can assume the function of what is known as a "tie rod", that is to say it can be provided that the housing structure plate is under tensile stress and clamps together the housing bottom and the housing cover and/or housing walls which lie opposite one another, between which the housing structure plate extends. If the battery cells expand during operation as a consequence of aging processes and an associated escape of electrolyte substances into the battery cell housing interior, that is to say if battery cells bulge during operation, corresponding forces can be absorbed by the housing structure plate which is under tensile stress. Here, the housing structure plate opposes bulging of the housing of the high voltage battery, that is to say bulging of the housing bottom and the housing cover and/or housing walls which lie opposite one another and between which the housing structure plate extends.

The housing structure plate can consist, for example, of aluminum or of an aluminum alloy. It can be produced, for example, in an extrusion process. As an alternative to this, it would also be contemplated that the housing structure plate consists of plastic and has been produced, for example, in an extrusion process, or that the housing structure plate consists of plastic, tubes which form cooling ducts having been molded or injection molded into the plastic.

As has already been mentioned above, it can be provided that the housing bottom and the housing cover are clamped together via the housing structure plate. It can be provided here that the housing structure plate is welded to the housing cover and/or to the housing bottom, for example by way of laser welding or by way of MIG welding. As an alternative or in addition to this, it can be provided that the housing structure plate is adhesively bonded and/or is connected by way of one or more screwed connections to the housing cover and/or to the housing bottom.

It is provided in accordance with one development of the invention that individual housing walls or all the housing walls are under tensile stress and clamp the housing bottom and the housing cover together.

Furthermore, it can be provided that the housing bottom is a sandwich component which is constructed from at least two layers. Sandwich components of this type have a relatively high flexural stiffness, which counteracts buckling of the housing of the high voltage battery. A sandwich component of this type can be made, for example, from plastic or from metal or from a composite material (for example, fiber reinforced plastic) or can consist both of plastic and of metal. It is to be noted expressly that the housing bottom does not necessarily have to be configured as a sandwich component, but rather can also be formed, for example, by way of a "single", that is to say single-layer plate.

An underside of the housing bottom can at the same time form an underside of the vehicle. A relatively rigid housing bottom, for example of sandwich design, would protect the battery cells in the case of "grounding" of the vehicle on an underlying surface from below. In order to keep the risk of grounding within limits, it can be provided that the spacing between the underside of the housing bottom and a roadway, on which the vehicle stands, lies in the range between 120 mm and 200 mm or in the range between 120 mm and 150 mm.

As has already been mentioned, it can be provided that the cooling ducts of the housing structure plate are flowed through by a refrigerant or a coolant. It can be provided, in particular, that the cooling ducts of the housing structure plate are connected to a refrigerant circuit, for example a refrigerant circuit of a vehicle air conditioning system of the vehicle, and are flowed through by a refrigerant. A refrigerant circuit of this type has an expansion member. The expansion member of a refrigerant circuit of this type is preferably arranged in the region of one of the housing walls or the housing cover or the housing bottom of the high voltage battery, that is to say in the vicinity of the high voltage battery or directly on the high voltage battery. Refrigerant which expands and cools in the process then flows immediately after the expansion operation into the high voltage battery or into the cooling ducts which are provided in the housing structure plate, as a result of which an optimum cooling action can be achieved. The spacing between the expansion member and a housing wall of the high voltage battery is preferably less than 20 cm, in particular less than 10 cm, in particular less than 5 cm. The expansion member is preferably arranged directly on a wall of the high voltage battery housing.

As an alternative to this, it can be provided that the expansion member is arranged directly on a flange, at which a refrigerant line of the refrigerant circuit is flange-connected to the high voltage battery.

Furthermore, a plurality of expansion members can be provided. For example, each cooling duct inlet can be assigned in each case one separate expansion member.

Furthermore, it is advantageous if the spacing between a refrigerant compressor of the refrigerant circuit and the housing of the high voltage battery is small. It can be provided, for example, that the refrigerant line length between the refrigerant compressor and the inlet into the housing of the high voltage battery is less than 100 cm or preferably less than 50 cm.

The battery cells of the high voltage battery can be, for example, what are known as "pouch cells". Each of said cells can have a housing which consists of sheet metal or can be surrounded by a container which consists of a metal foil. The "container" which surrounds a cell of this type can also consist of a plastic film which is coated or vapor-deposited with a metal layer, for example an aluminum layer.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
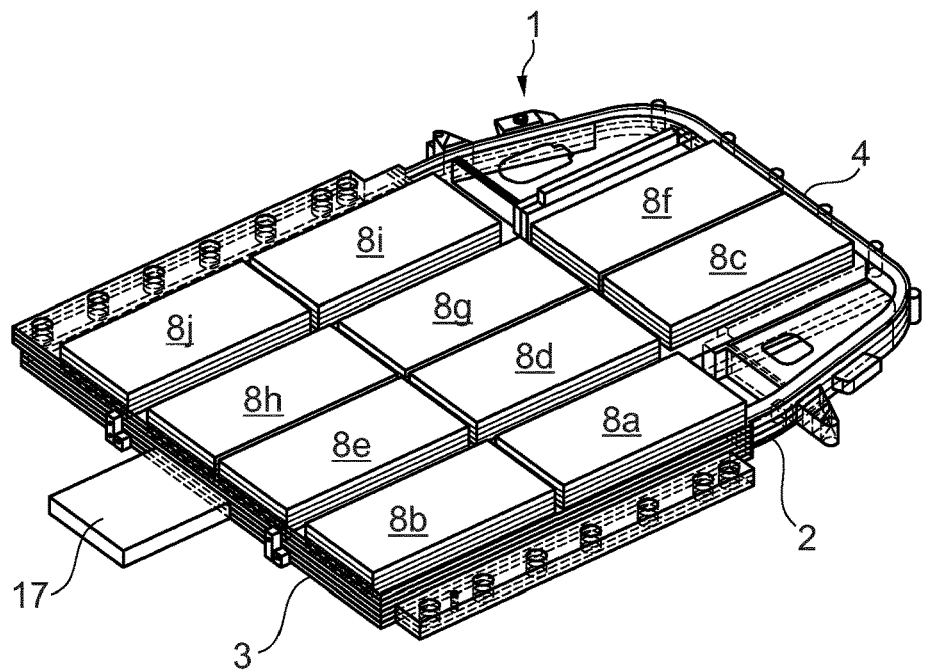
FIG. 1 is a perspective illustration of a high voltage battery in accordance with an embodiment of the invention.

FIG. 1 shows a high voltage battery 1 which has a housing. The housing has a housing cover (not shown in greater detail here) and a housing bottom 2 which is arranged spaced apart from the housing cover. The housing bottom 2 and the housing cover (not shown) which is arranged spaced apart in parallel from the housing bottom 2 are connected to one another via housing walls, namely via a front wall 3, a rear wall 4, a right-hand side wall 5a, 5b and a left-hand side wall 6a, 6b. The high voltage battery 1 can be arranged in a vehicle in such a way that the side walls 5a, 5b and 6a are parallel to a vehicle longitudinal direction 7.

A plurality of stacks of electric battery cells are arranged in the housing of the high voltage battery 1. The battery cell stacks are denoted in FIGS. 1 and 2 by the designations 8a-8j.

The battery cell stacks 8a, 8b are arranged behind one another in the driving direction 7. For example, the battery cell stacks 8c, 8d, 8e are likewise arranged behind one another in the driving direction 7. An element which is called a "housing structure plate 9" (cf. FIG. 3) extends in the longitudinal direction 7 of the high voltage battery 1 or of the vehicle, between the battery cell stacks 8a, 8b on one side and the battery cell stacks 8c, 8d, 8e on the other side. A housing structure plate 10 which can be constructed identically to the housing structure plate 9 likewise extends between the battery cell stacks 8i, 8j on one side and the battery cell stacks 8f, 8g, 8h on the other side.

Figure 3:
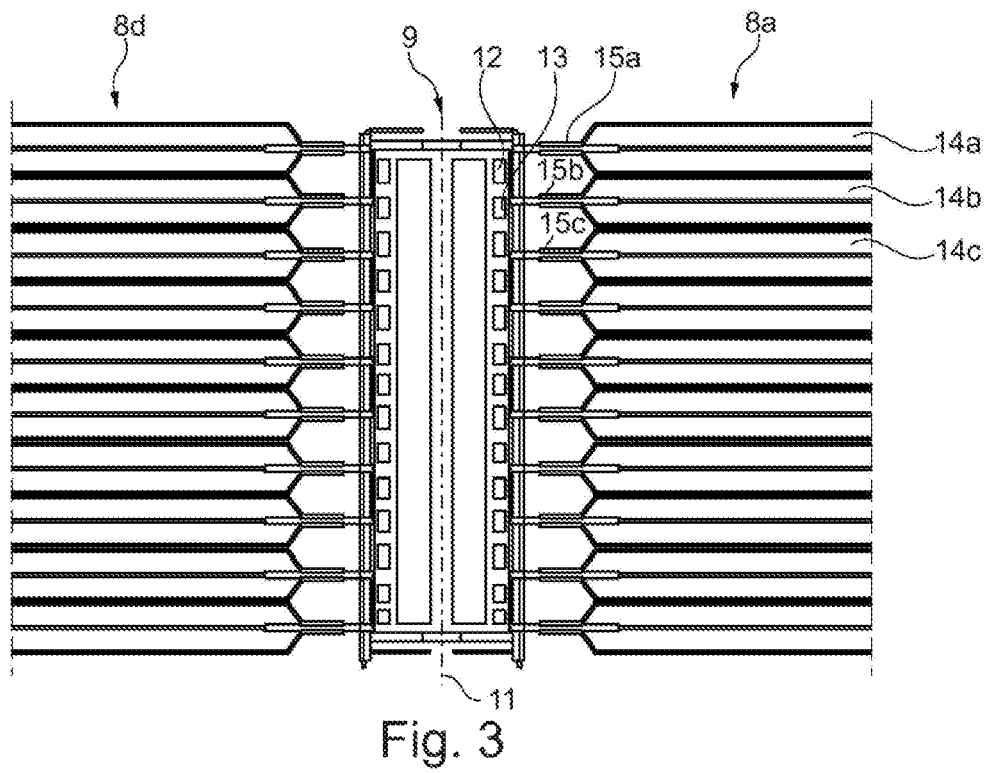
FIG. 3 is a sectional view along the sectional line A-A which is shown in FIG. 2.

As can be seen from FIG. 3, the housing structure plate 9 is of symmetrical construction here with regard to a center plane 11. The center plane 11 or "large sides" of the housing structure plate 9 is/are perpendicular with respect to the housing bottom 2 and with respect to the housing cover of the high voltage battery 1 and, therefore, perpendicular with respect to a roadway, on which a vehicle, in which the high voltage battery 1 is installed, stands.

On each of its two sides, the housing structure plate 9 which is shown in FIG. 3 has integrated cooling ducts, of which two cooling ducts are denoted by the designations 12, 13 merely by way of example. The cooling duct 12 can be, for example, an inflow duct, and the cooling duct 13 can be a return duct. It can be provided, for example, that the cooling duct 12 is flowed through by a coolant or a refrigerant in a direction which is directed into the plane of the drawing, and the cooling duct 13 is flowed through by a coolant or a refrigerant in a direction which is directed out of the plane of the drawing.

As a result, the housing structure plate 9 acts as a type of "countercurrent heat exchanger". Deflecting line sections can be provided in each case at front-side ends of the housing structure plate 9, via which deflecting line sections an end of an inflow duct 12 is connected fluidically to a duct start of a return duct 13, in a similar manner to what is the case in countercurrent heat exchangers. For example, the battery cell stacks 8a, 8d which are formed in each case by way of a plurality of battery cells 14a, 14b, 14c etc. which are stacked above one another are arranged on the two sides of the housing structure plate 9 which face away from one another. Each of the battery cells has in each case at least one connector pole 15a, 15b, 15c, etc. The connector poles 15a, 15b, 15c, etc. of the battery cells 14a, 14b, 14c, etc. are connected to the housing structure plate 9 in a thermally conducting and electrically insulated manner.

Heat which is produced in the battery cells 14a, 14b, 14c can be dissipated via the connector poles 15a, 15b, 15c to the housing structure plate 9, and can be discharged from the high voltage battery 1 via the cooling liquid which flows through the cooling ducts 12, 13 or the refrigerant which flows through the cooling ducts 12, 13.

As can be seen from FIG. 3, the housing structure plate 9 has a box profile (or rectangular profile) which imparts a comparatively high rigidity to the high voltage battery 1 in the longitudinal direction 7. In the case of a longitudinal crash of the vehicle, the housing structure plate 9 therefore opposes a deformation of the housing of the high voltage battery 1.

In addition, the housing structure plate 9 can assume the function of a "tie rod", if the housing bottom 2 and the housing cover (not shown) are clamped together via the housing structure plate 9. It can also be provided, for example, that the housing bottom 2 and the housing cover (not shown) are welded, screwed and/or adhesively bonded or connected in some other way to an underside and an upper side of the housing structure plate 9, respectively. The housing structure plate 9 therefore opposes forces which would buckle the housing bottom 2 and/or the housing cover.

Figure 4:
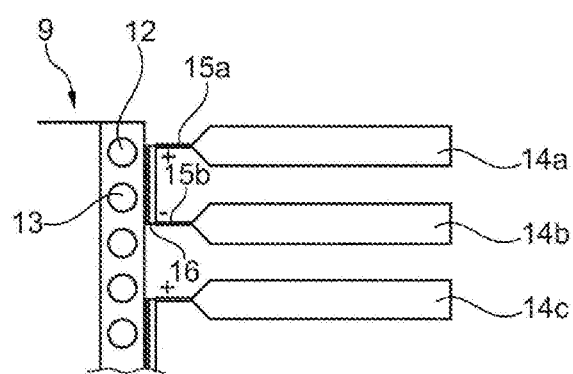
FIG. 4 is an enlarged illustration of the high voltage battery in the region in which connector poles of the battery cells are connected to the housing structure plate in a thermally conducting manner.

FIG. 4 shows an enlarged illustration of the section through the high voltage battery 1 in the region of the housing structure plate 9. As can be seen from FIG. 4, a positive pole of the battery cell 14*a* is connected electrically to a negative pole of the battery cell 14*b*. At the same time, the two connector poles 15*a*, 15*b* are connected to an outer side of the housing structure plate 9 in a thermally conducting manner, for example via a thermally conducting adhesive layer 16, as a result of which a satisfactory heat transfer is achieved between the connector poles 15*a*, 15*b* and the housing structure plate 9.

Figure 2:
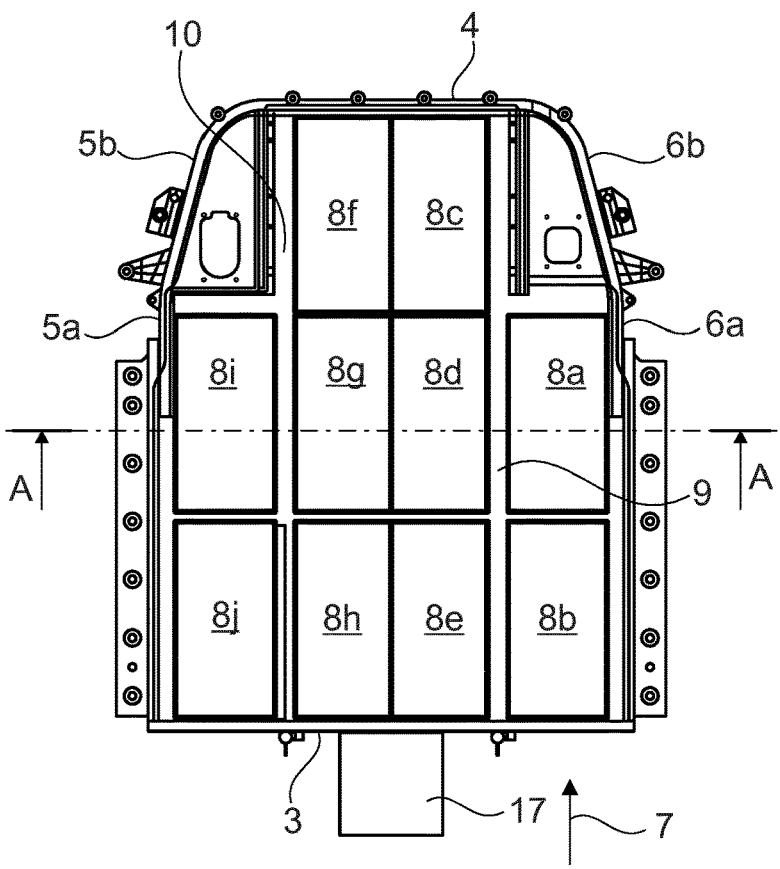
FIG. 2 is a plan view of the high voltage battery of FIG. 1.

As can be seen from FIGS. 1 and 2, an expansion member 17 can be arranged, for example, on or in the vicinity of the front wall 3 (or another housing wall), in which expansion member 17 refrigerant is expanded which flows into the cooling ducts which are contained in the housing structure plates 9, 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a high voltage battery, comprising:
   a housing of the high voltage battery, wherein the housing comprises:
      a housing bottom which is substantially parallel to a roadway on which the vehicle stands or drives;
      a housing cover which is arranged spaced apart from the housing bottom;
      housing walls, via which the housing bottom is connected to the housing cover;
      at least one housing structure plate, the housing structure plate comprising:
         a flat surface which is perpendicular with respect to the housing bottom and the housing cover, the flat surface having a larger surface area than a surface area of edge surfaces of the at least one housing structure plate that are parallel to the housing bottom and the housing cover;
         an underside which faces the housing bottom or connects to the housing bottom, and an upper side which faces the housing cover or connects to the housing cover; and
         at least one cooling duct provided in an interior of the housing structure plate, said at least one cooling duct being flowed through by a refrigerant or a coolant; and
   at least one or more electric battery cells arranged, in each case, on a first side and a second side of the housing structure plate, wherein the second side lies opposite the first side;
   wherein
      the one or more battery cells have, in each case, a positive and a negative connector pole, and
      at least one connector pole of the one or more battery cells is connected in a thermally conducting and electrically insulated manner to the first or the second side of the housing structure plate.

2. The vehicle as claimed in claim 1, wherein
   at least two parallel cooling ducts are provided in the interior of the housing structure plate, which parallel cooling ducts are flowed through by refrigerant or coolant in directions which are opposed with respect to one another.

3. The vehicle as claimed in claim 1, wherein
   the housing structure plate is arranged between two housing walls which lie opposite one another.

4. The vehicle as claimed in claim 1, wherein
   a first plurality of said cooling ducts act as inflow ducts and a second plurality of said cooling ducts, which are parallel to said first cooling ducts, act as return ducts and are flowed through in the opposite direction to the inflow ducts.

5. The vehicle as claimed in claim 1, wherein
   at least one deflecting line section is provided, via which one end of an inflow duct is flow-connected to a duct start of a return duct.

6. The vehicle as claimed in claim 5, wherein
   at least one deflecting line section is formed by way of a component which is inserted between an end side of the housing structure plate and a housing wall.

7. The vehicle as claimed in claim 5, wherein
   an end side of the housing structure plate reaches directly as far as a housing wall and is connected to it, and the at least one deflecting line section is integrated into the housing wall.

8. The vehicle as claimed in claim 1, wherein
   in each case at least one battery cell stack, which is formed by way of a plurality of battery cells which are connected electrically to one another, is arranged on the first side and the second side of the housing structure plate.

9. The vehicle as claimed in claim 1, wherein
   the housing structure plate extends in a vehicle longitudinal direction and counteracts crushing of the housing in the case of a longitudinal crash of the vehicle.

10. The vehicle as claimed in claim 1, wherein
    in each case a plurality of battery cell stacks are arranged along the first side and along the second side of the housing structure plate.

11. The vehicle as claimed in claim 1, wherein
    at least two housing structure plates which are arranged parallel to one another are provided in the housing, which housing structure plates in each case have a first and a second side, along which in each case a plurality of battery cell stacks are arranged.

12. The vehicle as claimed in claim 1, wherein
    the battery cells in each case have an upper side and an underside which form the largest sides of the respective battery cell and which are arranged substantially parallel to the housing bottom and to the housing cover.

13. The vehicle as claimed in claim 1, wherein
    the connector pole or poles of the battery cells are connected to the housing structure plate via a thermally conducting and electrically insulating adhesive layer.

14. The vehicle as claimed in claim 1, wherein
    the housing structure plate is under tensile stress and clamps the housing bottom and the housing cover together.

15. The vehicle as claimed in claim 1,
    wherein the housing structure plate is made of aluminum or of an aluminum alloy and has been produced in an extrusion process.

16. The vehicle as claimed in claim 1, wherein
    the housing structure plate is made of plastic in an extrusion process, or the housing structure plate is made of plastic, tubes which form the cooling ducts having been molded or injection molded into the plastic.

17. The vehicle as claimed in claim 1, wherein the housing structure plate is welded to the housing cover and/or to the housing bottom.

18. The vehicle as claimed in claim 1, wherein the housing structure plate is adhesively bonded to the housing cover and/or to the housing bottom.

19. The vehicle as claimed in claim 1, wherein the housing structure plate is connected to the housing cover and/or to the housing bottom by way of screwed connections.

20. The vehicle as claimed in claim 1, wherein individual housing walls or all the housing walls are under tensile stress and clamp the housing bottom and the housing cover together.

21. The vehicle as claimed in claim 1, wherein the housing bottom is a sandwich component which is constructed from at least two layers.

22. The vehicle as claimed in claim 1, wherein an underside of the housing bottom forms an underside of the vehicle.

23. The vehicle as claimed in claim 1, wherein a spacing between the roadway and the underside of the housing bottom lies in a range between 120 mm and 200 mm or in the range between 120 mm and 150 mm.

24. The vehicle as claimed in claim 1, wherein the cooling ducts of the housing structure plate are connected to a refrigerant circuit of the vehicle and are flowed through by the refrigerant.

25. The vehicle as claimed in claim 24, wherein the refrigerant circuit has an expansion member which is arranged in the region of one of the housing walls of the high voltage battery.

26. The vehicle as claimed in claim 25, wherein a spacing between the expansion member and one of the housing walls is less than 20 cm.

27. The vehicle as claimed in claim 25, wherein the expansion member is arranged on a flange, at which a refrigerant line of the refrigerant circuit is flange-connected to the high voltage battery.

28. The vehicle as claimed in claim 1, wherein the battery cells have a housing which is made of sheet metal, or are surrounded by a container which is made of a metal foil.

* * * * *